United States Patent [19]

Gaines

[11] 4,392,918
[45] Jul. 12, 1983

[54] TOROIDAL FIELD COIL TORQUE STRUCTURE

[75] Inventor: Albert L. Gaines, West Simsbury, Conn.

[73] Assignee: Combustion Engineering, Inc., Windsor, Conn.

[21] Appl. No.: 60,555

[22] Filed: Jul. 25, 1979

[51] Int. Cl.³ .............................................. G21B 1/00
[52] U.S. Cl. .................................... 376/133; 376/146
[58] Field of Search ........................................ 176/3-9

[56] References Cited

U.S. PATENT DOCUMENTS 3,009,080  11/1961  Loos ...................................... 176/3

FOREIGN PATENT DOCUMENTS 96015  5/1963  Denmark .
51-12098  1/1976  Japan ..................................... 176/3

OTHER PUBLICATIONS

Procedings of 7th Eng. Sym. on Fusion Res., vol. 1, 10/25-28/77, pp. 121-124, 194-197, 469-472, 625-633, 818-825, Smith et al.
Proc. 5th Symp. on Eng. Pbs. of Fus. Res., Nov. 5-9, 1973, pp. 65-68, Tenny, 176-3, IEEE Pub. No. 73CH 0843-3-NPS.
Proc. 9th Symp. on Eng. Fus. Tech., Jun. 14-18, 1976, p. 453, Fintor.
Nuclear Fusion-Supplement 1977, Plasma Physis & CNF Res., vol. 1, IAEA-CN-35/A105, pp. 335-350, Cima et al.

*Primary Examiner*—S. A. Cangialosi
*Attorney, Agent, or Firm*—Arthur E. Fournier, Jr.

[57] ABSTRACT

A torque structure particularly suitable for utilization in a power reactor of the Tokamak-type, and operable therein for purposes of providing support for the toroidal field (TF) coils that comprise one of the major operating components of such a Tokamak power reactor. The subject torque structure takes the form of a frame structure that is operable to enable torque loads acting on the TF coils to be equilibrated as close to the area of force application as feasible. The aforesaid torque structure includes an intercoil structure composed of spacer wedges that are interposed between each adjacent pair of TF coils. The spacer wedges, in turn, consist of bearing plates positioned between the TF coils so as to be in contacting relation therewith and a number of cross plates that are cooperatively associated with the bearing plates so as to form therewith a rigid assembly. The intercoil structure is affixed to a segmented, membrane shell that surrounds, encloses and supports the TF coil frames. Access is had to the interior of the shell through an opening formed for this purpose in a reinforced portion of the shell. Eddy current losses are minimized by insulating the joints formed at the juncture of adjoining segments of the shell.

10 Claims, 7 Drawing Figures

TOROIDAL FIELD COIL TORQUE STRUCTURE

BACKGROUND OF THE INVENTION

This invention relates to frame structures, and, more particularly, to a frame structure that is capable of being employed as a torque structure for providing support for the toroidal field (TF) coils of a Tokamak power reactor to minimize movement of the TF coil super conductor material during the intermittent operation of the poloidal field coils of the Tokamak power reactor by equilibrating the torque loads acting on the TF coils as close to the area of force application as feasible.

Relatively speaking, in recent years, a significant amount of attention has been directed to the potential use at some time in the future of fusion reactors as a source of power for assisting in meeting the energy needs not only of our own nation, but also those of the world in general. A requirement associated with the operation of such fusion reactors is the need to effect a suitable confinement of the plasma that is to be found present therewithin. More specifically, in accord with the mode of operation of such fusion reactors, generally speaking, it is intended that fusion reactions will occur within the plasma. Moreover, upon a realization of the proper conditions, the energy obtained as a consequence of such fusion reactions occurring in the plasma will exceed the input energy, and thereby provide useful power. However, in order to achieve such a result, basically, it is necessary that the plasma be confined in a particular region for an appreciable period of time at extremely high temperatures.

It has been recognized for some time that the employment of solid wall containers of known materials would be unsuitable for effecting the afore-referenced confinement of the plasma. Namely, even materials that are known to be resistant to the highest temperatures and that embody the greatest thermally insulative qualities would be ineffective for this purpose. Principally, this is attributable to the fact that the engagement of the plasma ions operates to produce a cooling of the plasma. Such cooling, in turn, inhibits the establishment of the conditions that are required in order for the desired fusion to occur.

As a consequence, a number of alternative methods of effecting confinement of the plasma have been examined. In this regard, attention has been directed to various schemes involving the employment of different types of magnetic and electrical field configurations. One such configuration, which has found considerable favor is that wherein a toroidal magnetic field is utilized. More specifically, this approach has given rise to a design that has been proposed by the Russians and to which the name "Tokamak" has been given. Moreover, it is to such a Tokamak device that the subject matter of the present invention principally pertains, and particularly that aspect thereof, which relates to the manner in which the support for the toroidal field (TF) coils employed therein is effected.

With regard to the matter of supporting the magnets that are found embodied in a Tokamak device, there are a number of factors to which consideration must be given. First, there is the matter of insuring that the magnets are provided with sufficient structural strength to provide the requisite degree of internal support thereto. Secondly, because of the extremely low temperatures at which these magnets are designed to operate, there is a need to accomplish the load transfer from the magnets to the support structure without experiencing excessive heat loss. Thirdly, in addition to fulfilling the requirement for internal support of the magnets, there also exists a need to provide a support structure that is capable of enabling the magnets to successfully withstand the large lateral forces that are induced on the TF coils.

Heretofore, there have been basically two types of torque structures proposed for use in Tokamak devices for purposes of providing the support required by the TF coils. For ease of reference, these two prior art types of torque structures will be referred to hereinafter as the external torque structure and the internal torque structure. Insofar as concerns the nature of construction of the external torque structure, the latter, in general, consisted of structural beams, columns, etc., located in planes above and below the TF coils, and which are connected at a good distance outside the positions of the TF coils. The internal torque structure, on the other hand, in general consisted of beams located between adjacent TF coils and positioned above and below the horizontal center plane of the Tokamak device. As taught in the prior art, the external form of torque structure, i.e., frame, is disadvantageously characterized in that such a frame interferes with the location of the diagnostics and of the other devices that are required to operate the Tokamak device. While in the case of the internal form of torque frame, there is a requirement associated with the use thereof whereby the structure of the TF coil or its case has to equilibrate the opposing moments acting on the tops and bottoms of each TF coil.

With further regard to the matter of the large lateral forces that are induced on the TF coils, the effect thereof is to create a torque in a given direction at the top of the TF coil and an equal and opposite torque at the bottom of the same TF coil. Consequently, the magnets must be suitably supported so as to enable such loads to be transmitted without producing excessive stresses or deflections. Moreover, to accomplish the latter, i.e., the transmission of the loads in the afore-referenced manner, the torque restraint must use direct load paths. On the other hand, such direct load paths for the transmission of the aforesaid loads must concomitantly enable adequate access to be had to the interior of the Tokamak device for purposes of effecting the remote maintenance of the components housed therein, i.e., maintenance on the components of the fusion reactor. Namely, although the possibility exists that access can be had to the internally housed components through the removal of structural members, it is desirable that there be present the capability for providing direct access for remotely conducting maintenance on such components without the need for removal of any structural members.

There has, thus, been evidenced in the prior art a need for an improved form of torque structure employable in a Tokamak device that would embody those features selected from both an external form of torque structure and an internal form of torque structure that serve to advantageously characterize each of the latter forms of torque structure. More specifically, there is a need to provide a design for a torque structure that would function to minimize movement of the TF coil super conductor material during the intermittent operation of the poloidal field coils that are also to be found embodied in a Tokamak device. Moreover, such a torque structure should be capable of effecting such a minimization of the afore-referenced movement by equilibrating the loads induced on the TF coils as close to the area of force application as feasible. In summary, a torque structure is desired, which provides for an inter-coil structure that exists over the area of the major out-of-plane force application to which the TF coils are subjected so as to, thus, support the TF coil structure during pulsed operation of the poloidal coils and during faulted conditions in the TF coils. Concomitant with the embodiment therein of such an intercoil structure, the proposed torque structure should desirably also possess the capability of enabling access to be had to the plasma located within the Tokamak device. Additionally, suitable provisions should be made in the proposed torque structure for equipping the latter with the requisite coolant circuits as well as the accompanying instrumentation and controls that are required to enable the low temperature differentials to be maintained between the TF coil frames, the torque structure, and the other components that are cooperatively associated therewith.

It is, therefore, an object of the present invention to provide a new and improved form of frame structure suitable for use in providing support for selected components of an operating apparatus.

It is another object of the present invention to provide such a frame structure that is employable in a fusion reactor for providing support to the means being utilized for effecting the confinement of the plasma therein.

It is still another object of the present invention to provide such a frame structure that is particularly suitable for use in a Tokamak-type device to afford support to the toroidal field (TF) coils, which the latter device embodies.

A further object of the present invention is to provide such a frame structure that is operable as a torque structure to provide support to the TF coils by equilibrating the torque loads acting on the TF coils as close to the area of force application as feasible.

A still further object of the present invention is to provide such a torque structure, which includes an intercoil structure that is designed to be affixed to a segmented, membrane shell that surrounds, encloses and supports the TF coil frames.

Yet another object of the present invention is to provide such a torque structure that is characterized in that it still permits adequate access to be had to the interior of the Tokamak-type device for purposes of accomplishing remote maintenance on components housed internally therein.

Yet still another object of the present invention is to provide such a torque structure which is relatively less costly to provide that prior art forms of torque structures, that is advantageously characterized in that it embodies the desirable features of both external and internal forms of torque structures, and yet remains capable of providing the requisite degree of support to the TF coils of a Tokamak-type device.

SUMMARY OF THE INVENTION

In accordance with the present invention, there is provided a novel and improved torque structure, particularly suitable for employment in a Tokamak power reactor for purposes of affording support to the TF coils thereof so as to thereby minimize movement of the TF coil super conductor material during the intermittent operation of the poloidal field coils of the Tokamak power reactor by equilibrating the torque loads acting on the TF coils as close to the area of force application as feasible. The subject torque structure provides an intercoil structure over the area of major out-of-plane force applications that is operable to support the TF coil structure during pulse operation of the poloidal coils and during faulted conditions in the TF coils. The intercoil structure, which is composed of spacer wedges, is welded to a segmented, membrane shell that surrounds, encloses and supports the TF coil frames. The membrane shell, in turn, functions to transmit loadings between spacer wedges, thereby greatly reducing the structural requirements on the TF coil frames, and to equilibrate the forces acting in opposition on the upper and lower portions of each TF coil. Access is obtainable to the plasma contained within the Tokamak power reactor through an opening formed for this purpose in a reinforced portion of the membrane shell. Eddy current losses are minimized by insulating the joints between shell segments. Finally, the subject torque structure is capable of being equipped with cryogen coolant circuits, and the instrumentation and controls necessary to permit maintenance of low temperature differences between the TF coil frames, the torque structure, and the other components that are cooperatively associated therewith.

DESCRIPTION OF A PREFERRED EMBODIMENT

Figure 1:
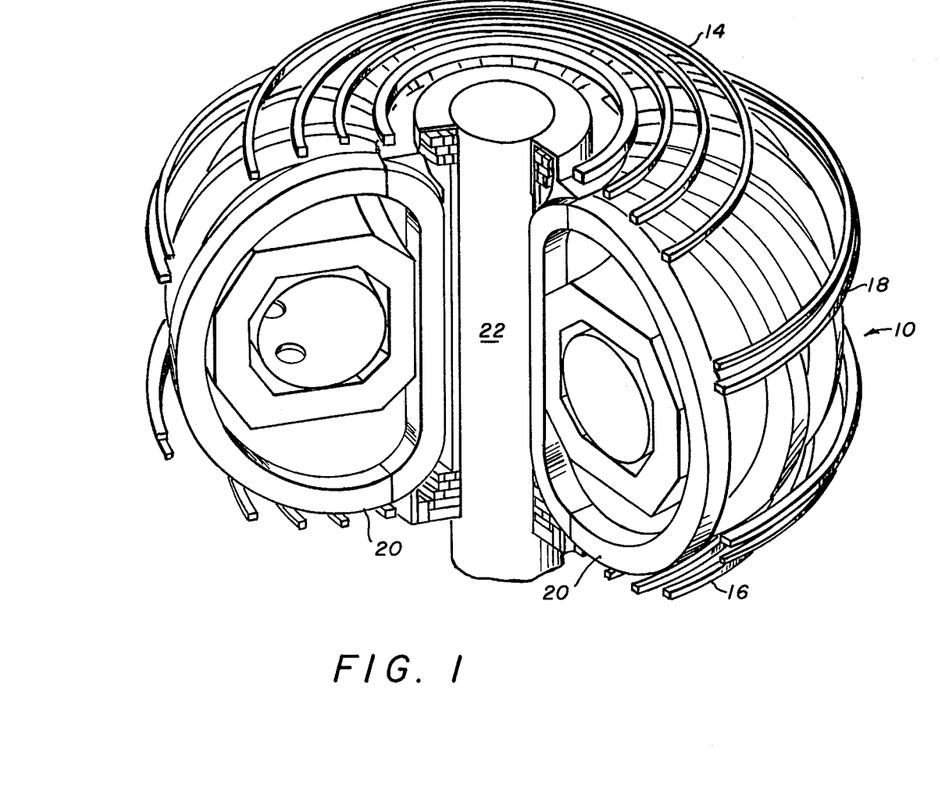
FIG. 1 is a schematic representation of some of the major operating components of a Tokamak power reactor of the type in which a torque structure constructed in accordance with the present invention is particularly suited to be employed.
Figure 2:
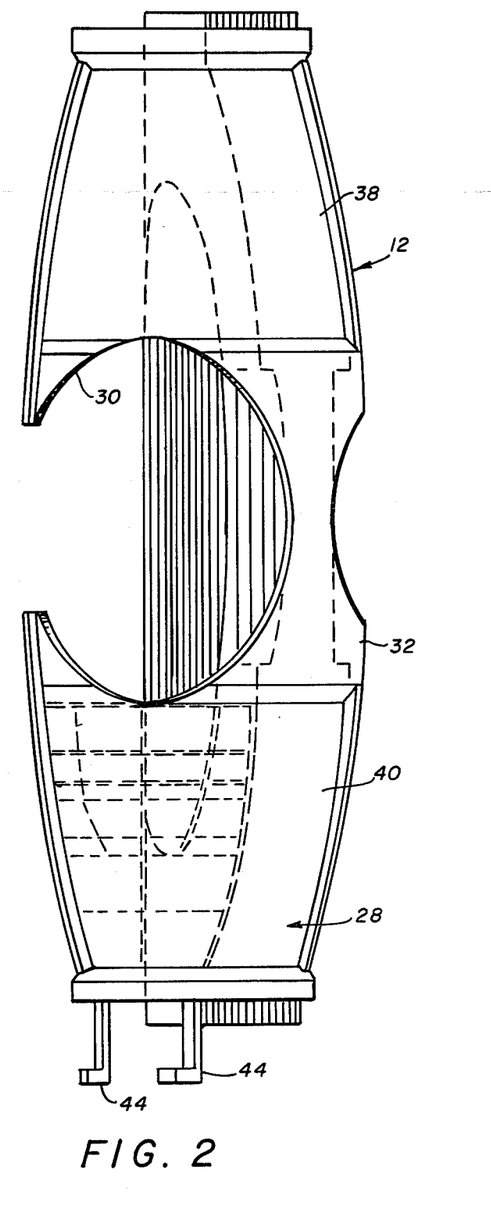
FIG. 2 is a side elevational view of a torque structure constructed in accordance with the present invention.

Referring now to the drawing and, more particularly, to FIG. 1 thereof, there is depicted therein a schematic representation of some of the major operating components of a Tokamak power reactor, the latter reactor being generally designated therein by reference numeral 10. Inasmuch as the nature of the construction and the mode of operation of Tokamak power reactors in general can be found described and illustrated in the literature of the prior art, it is not deemed necessary to set forth at length hereinafter the specific constructional details of the Tokamak power reactor 10 of FIG. 1. Rather, it is deemed sufficient for purposes of providing one with an understanding of the subject matter of the present invention to merely briefly describe herein with particular reference to FIG. 1 of the drawing, some of the major operating components that are embodied in the Tokamak power reactor 10 and with which the torque structure constructed in accordance with the present invention, that is generally designated in FIG. 2 by the reference numeral 12, is intended to function.

More specifically, as shown in FIG. 1, some of the major operating components that are to be found embodied in the Tokamak power reactor 10 are the upper poloidal coils 14, the lower poloidal coils 16, the outer poloidal coils 18, a multiplicity of toroidal field (TF) coils 20, and a so-called compression hub, i.e., bucking post 22. Generally speaking, the arrangement of the afore-referenced components in the Tokamak power reactor 10 is such that the TF coils extend radially outwardly from the bucking post 22, and the poloidal coils 14, 16 and 18 are located outwardly of the TF coils 20 substantially in surrounding relation thereto.

Figure 3:
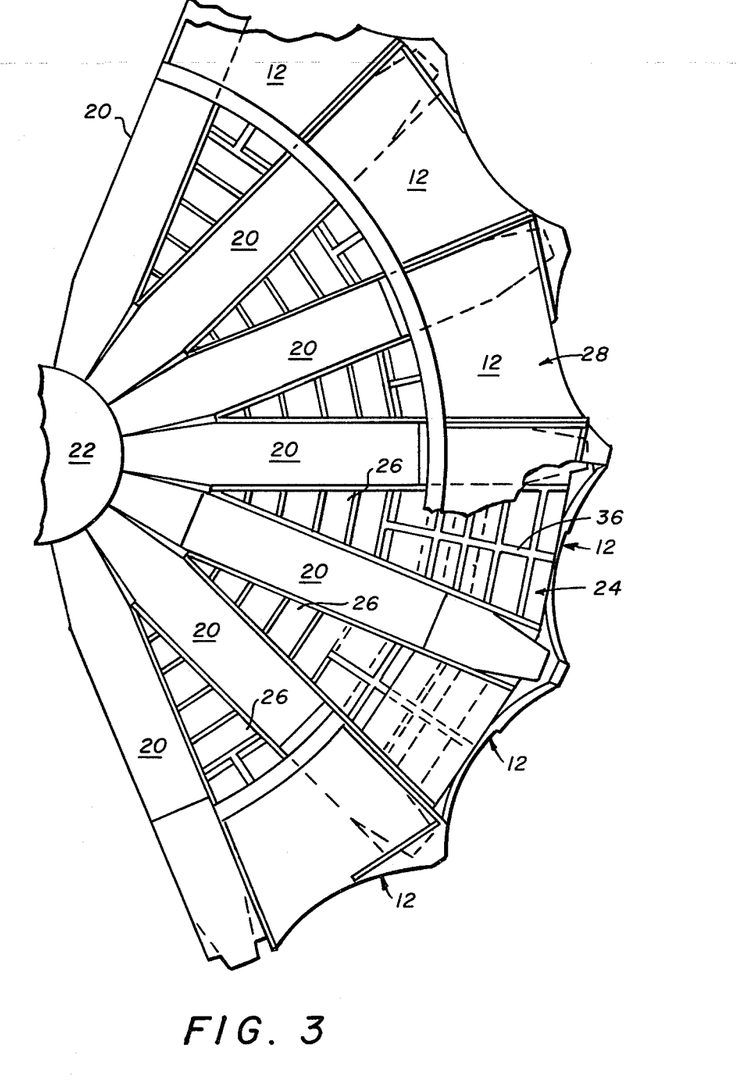
FIG. 3 is a top plan view with some parts broken away of a portion of a Tokamak power reactor embodying torque structures constructed in accordance with the present invention, illustrating the torque structures positioned in assembled relation to the TF coils of the reactor.

As best understood with reference to FIG. 3 of the drawing, each of the TF coils 20 has cooperatively associated therewith a torque structure 12 constructed in accordance with the present invention. Moreover, at least for purposes of the discussion herein, each of the TF coils 20, when considered in combination with the associated torque structure 12, may be viewed as comprising an assembly. Accordingly, in accord with the best mode embodiment of the invention, the Tokamak power reactor 10 embodies a multiplicity of torque structures 12 that in number are equal to the number of TF coils 20 that the reactor 10 embodies.

Inasmuch as each of the torque structures 12 that are to be found embodied in the Tokamak power reactor 10 are of identical construction, it is deemed sufficient for purposes of obtaining an understanding thereof to simply describe herein the nature of the construction and the mode of operation of one such torque structure 12. In this connection, reference will thus be had particularly to FIGS. 2-7 of the drawing for a showing of the details of construction of a torque structure 12 constructed in accordance with the present invention.

As has previously been mentioned hereinbefore, from the standpoint of conceptual design, the torque structure 12 constructed in accordance with the present invention, combines features of both an internal torque structure and an external torque structure. Namely, the intent of the design of the torque structure 12 is to minimize movement of the TF coil superconductor material during the intermittent operation of the poloidal field coils 14, 16 and 18, by equilibrating the torque loads as close to the area of force application as feasible. Note is taken here of the fact that it is common in an internal torque structure for the TF coil structure to be used to transmit loadings from one beam to the adjacent intercoil beams as well as to equilibrate the opposing forces in the upper and lower portions of the TF coils, whereas it is common in an external torque structure to utilize an assembly of beams, columns, and braces, or tie rods to resist the deflections of the TF coil structure and to equilibrate the opposing forces.

In contrast thereto, i.e., in contrast to the form of construction commonly found embodied in internal and/or external torque structures, in accord with the best mode embodiment of the present invention, the torque structure 12 provides an intercoil structure, generally designated in the Figures of the drawing by the reference numeral 24, over the area of major out-of-plane application, which is designed to support the TF coil structure during pulsed operation of the poloidal coils 14, 16 and 18, and during faulted conditions in the TF coils 20. As will be described more fully hereinafter, the intercoil structure 24 emcompasses a multiplicity of spacer wedges 26, which, in turn, are welded to a segmented, membrane shell 28 that surrounds, encloses and supports the TF coil frames. The membrane shell 28 acts to transmit loadings between the spacer wedges 26, thereby greating reducing the structural requirements on the TF coil frame, and further acts to equilibrate the forces acting in opposition on the upper and lower portions of each TF coil 20. In a manner yet to be described, access to the plasma that is within the Tokamak power reactor 10 is obtainable through an opening 30, which is provided for this purpose in a reinforced portion 32 of the membrane shell 28. Likewise, the need to minimize eddy current losses is accomplished by means of providing insulation at the joints formed between adjoining segments of the membrane shell 28, in a manner which will be described subsequently in connection with reference to FIGS. 2 and 5-7 of the drawings. Although not shown in the drawings in the interest of maintaining clarity of illustration therein, and inasmuch as they are only indirectly related to the subject matter of the present invention, it is to be understood that the torque structure 12 is designed to be equipped with suitable cryogen coolant circuits, and the instrumentation and controls that are required to permit maintenance of low temperature differences between the TF coil frames, the torque structure 12, the bucking post 22, and the other components cooperatively associated therewith. The latter, including all other components operating at cryogenic temperatures within the Tokamak power reactor 10, are for purposes of the present invention, treated as a system due to the interaction between these components in responding to thermal, magnetic and gravitational influences.

Proceeding now with a more detailed description of the nature of the construction of the torque structure 12, a plurality of spacer wedges 26, as best understood with reference to FIG. 3 of the drawing, are suitably positioned in accord with the best mode embodiment of the invention in interposed relation between adjoining TF coils 20. By virtue of this form of construction, the out-of-plane loadings on the TF coils 20 are transferred circumferentially through the spacer wedges 26, which, as mentioned above, are located between adjacent TF coils 20. More specifically, two spacer wedges 26, one positioned above and one positioned below the corresponding access opening 30, are required between each pair of adjacent TF coils 20. Each of the spacer wedges 26, in turn, consist of bearing plates 34, best illustrated in FIG. 4, which are suitably supported so as to be located in juxtaposed relation to the corresponding TF coil 20, and a number of cross plates 36, which with the aforesaid bearing plates 34, are operative to create a rigid assembly. Rotation of the spacer wedges 26 under the influence of out-of-plane loads is resisted by affixing the former, preferably through the welding thereof, to the membrane-like shell 28. In accord with the best mode embodiment of the invention, the shell 28 is segmented, i.e., composed of multiple segments, for ease of manufacturing, i.e., so that a single curvature forming of plates suffices in manufacturing the segment. As best understood with reference to FIG. 2 of the drawing, the segment 38 of the shell 28 that is welded to the top spacer wedge 26 is connected to the segment 40 that is welded to the bottom spacer wedge 26 by a much thicker formed plate, i.e., reinforced portion 32. The increased thickness, which the portion 32 embodies, provides the strength needed to effect the equilibration of the opposing loads acting on the upper and lower halves of the TF coils 20, while concomitantly allowing for the large opening 30, which provides access to the plasma and plasma vessel contained within the Tokamak power reactor 10.

The access opening 30 is preferably formed so as to be elliptical in configuration in order to provide maximum access to the plasma without permitting excessive deflections to occur within the TF coil frames. Moreover, in accord with the best mode embodiment of the invention, access to the plasma is increased by removing wedges 26 in the area designated by reference numeral 42 in FIG. 4 of the drawing, i.e., from the sides of the outer leg of the TF coils 20. Preferably, the wedges 26 are removed only in the region of the access opening 30 so that the bearing surfaces of the TF coils 20 can be kept parallel.

Although not depicted in the drawing in the interest of maintaining clarity of illustration therein, a heavy ring (not shown) is preferably cooperatively associated with the torque structure 12 at the top and bottom of the latter for purposes of providing a clamping action on the TF coils 20 during thermal cycling. In addition, supports, generally designated by reference numeral 44, for the torque structure 12 are preferably positioned so as to be located under the spacer wedges 26 and so as to extend across the lower portion of the shell 28.

Figure 4:
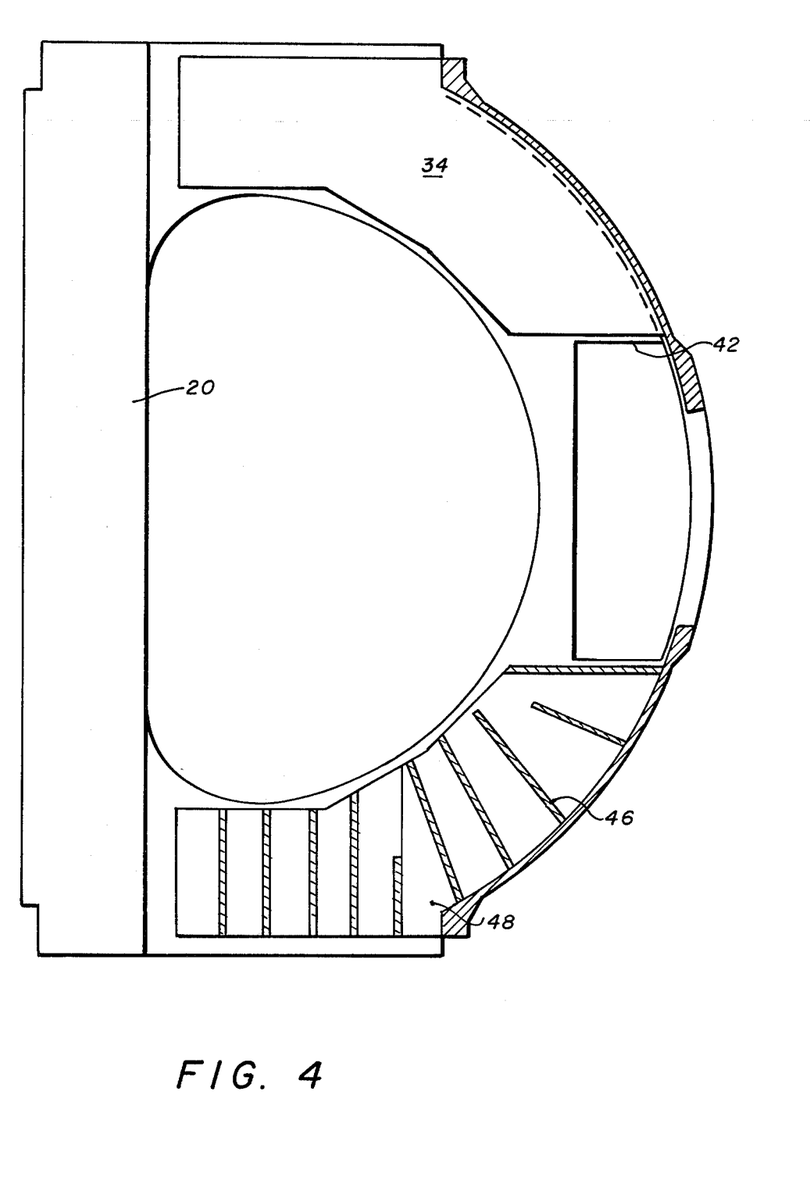
FIG. 4 is a side elevational view partially in section and on an enlarged scale of a torque structure constructed in accordance with the present invention.

Continuing with the description of the torque structure 12, in accord with the best mode embodiment thereof, internal bracing identified by reference numeral 46 in FIG. 4 is preferably employed between the bearing plates 34. In addition, note is taken in FIG. 4 of the preferred employment of a stabilizing plate, identified by the reference numeral 48, in conjunction with the utilization of wider cross plates 36.

Figure 5:
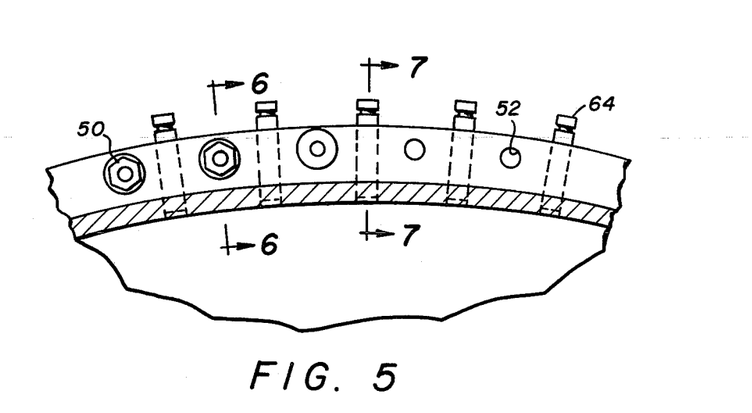
FIG. 5 is a plan view of a portion of one of the flange joints found in a torque structure constructed in accordance with the present invention.
Figure 6:
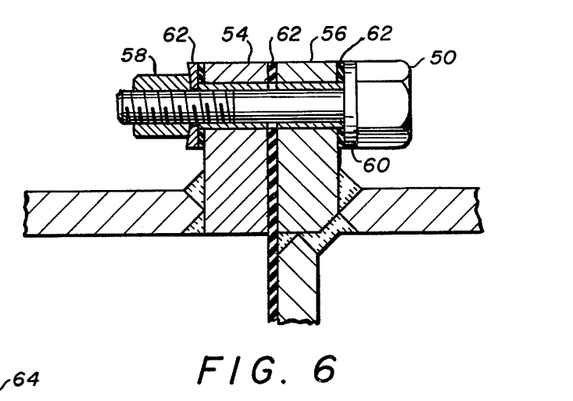
FIG. 6 is a cross sectional view of the threaded fastener that is employed in effecting a flange joint in a torque structure constructed in accordance with the present invention, taken substantially along the line 6—6 in FIG. 5.
Figure 7:
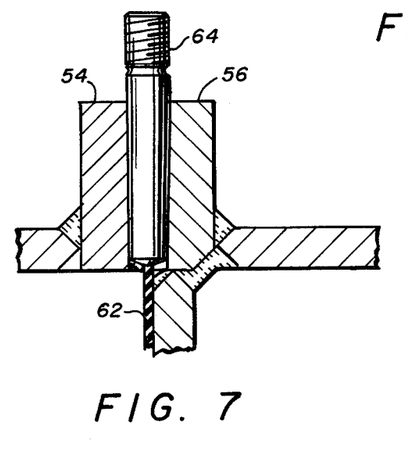
FIG. 7 is a cross sectional view of the tapered shear pin that is employed in effecting a flange joint in a torque structure constructed in accordance with the present invention, taken substantially along the line 7—7 in FIG. 5.

FIGS. 5-7 illustrate the nature of the joint construction that is preferably employed in the torque structure 12. Referring to FIG. 6, the fastening together of adjoining segments of the shell 28 is accomplished through the use of a plurality of suitable fasteners 50. The latter fasteners 50 are receivable in openings 52 provided for this purpose in flange portions 54 and 56 with which the afore-referenced shell segments are suitably provided. As best understood with reference to FIG. 6, the flange portions 54 and 56 are suitably secured to the shell segments by being welded thereto. However, other suitable methods of securing the flange portions 54 and 56 to the shell segments could be employed without departing from the essence of the invention. In addition, the threaded fasteners 50, i.e., bolts, are threadedly received in nuts 58. Moreover, preferably spherical washers 60 are utilized in cooperative association with the bolts 50 and the nuts 58. Finally, as has been mentioned hereinabove, suitable insulative material, designated by the reference numeral 62 in FIG. 6, is interposed between the bolts 50, the nuts 58 and the flange portions 54 and 56, i.e., between the mating surfaces formed at the joints, in an effort to minimize eddy current losses.

In addition to the bolts 50, shear pins 64 are also emplaced at the joints. More specifically, a plurality of such shear pins 64, as shown in FIG. 5, are positioned thereat. Each of the shear pins 64 preferably embodies a suitable taper as depicted in FIG. 7. The shear pins 64 are each received in a suitable opening (not shown) suitably provided for this purpose. Moreover, the shear pins 64 are each provided with a suitable insulative coating, i.e., the surfaces thereof are insulated, in an effort to minimize the flow of eddy currents through the structure.

Insofar as concerns the matter of effecting the assembly of the torque structure 12 in the Tokamak power reactor 10, the requirement that there be provided a relatively large access opening 30 in the shell 28 necessitates the use of a handling fixture to support the upper spacer wedge 26 until the latter is positioned in juxtaposed relation to a TF coil 20. Such a handling fixture should be capable of upending the segments that form the shell 28 from their shipping position, and of supporting the respective segment until the latter is nested with a TF coil 20. Moreover, in accord with the best mode embodiment of the invention, as each TF coil 20 is erected, a torque structure 12 is added. More specifically, two coils 20 and torque structures 12 preferably are assembled as a module and moved into contact with the bucking post 22. The insulating material, i.e., gaskets 62 will be emplaced and suitable insulation, i.e., insulating sleeves (not shown) will likewise be provided in the bolt holes 52. The bolts 50 are then installed and hand tightened. The alignment of the aforedescribed components is thereafter verified. The tensioning of the bolts 50 then proceeds according to a predescribed procedure until the desired spacing at all the flanges is obtained. Next, the shear pin slots on the flange faces are reamed, and the insulated tapered shear pins 64 are pressed home and wired in place. Finally, it is to be understood that assembly of coolant and instrumentation leads (not shown) proceeds concomitantly with the aforementioned steps of assembly.

Thus, in accordance with the present invention, there has been provided a new and improved form of frame structure that is suitable for use in providing support for selected components of an operating apparatus. Moreover, the subject frame structure of the present invention is employable in a fusion reactor for providing support to the means being utilized for effecting the confinement of the plasma therein. In addition, in accord with the present invention, a frame structure is provided that is particularly suitable for use in a Tokamak-type device to afford support to the toroidal field (TF) coils, which the latter device embodies. Further, the frame structure of the present invention is operable as a torque structure to provide support to the TF coils by equilibrating the torque loads acting on the TF coils as close to the area of force application as feasible. Additionally, in accordance with the present invention, a torque structure is provided, which includes an intercoil structure that is designed to be affixed to a segmented, membrane shell that surrounds, encloses and supports the TF coil frames. Also, the torque structure of the present invention is characterized in that it still permits adequate access to be had to the interior of the Tokamak-type device for purposes of accomplishing remote maintenance on components housed internally therein. Furthermore, in accord with the present invention, a torque structure is provided which is relatively less costly to provide than prior art forms of torque structures, which is advantageously characterized in that it embodies the desirable features of both external and internal forms of torque structures and yet remains capable of providing the requisite degree of support to the TF coils of a Tokamak-type device.

While only one embodiment of my invention has been shown, it will be appreciated that modifications thereof, some of which have been alluded to hereinabove, may still be readily made thereto by those skilled in the art. I, therefore, intend, by the appended claims, to cover the modifications alluded to herein as well as all other modifications, which fall within the true spirit and scope of my invention.

I claim:

1. In a fusion reactor of the Tokamak-type that employs a toroidal magnetic field for purposes of effecting the confinement of the plasma therewithin, the fusion reactor including a multiplicity of toroidal field coils operable to produce said toroidal magnetic field, the improvement comprising a torque structure for providing support for the multiplicity of toroidal field coils, said torque structure forming a frame structure operable to enable torque loads acting on the toroidal field coils to be equilibrated as close to the area of force application as possible, said torque structure comprising:
   a. a membrane shell positioned in surrounding relation to the toroidal field coils and operative to substantially enclose the toroidal field coils therewithin, said membrane shell including a multiplicity of membrane sections interconnected one to another so as to collectively effect the enclosure of the toroidal field coils, each of said multiplicity of membrane sections including a first segment, a second segment and a third segment, said first segment being operative to define a plane, said second segment having one end thereof affixed to one end of said first segment, said second segment having the other end thereof spaced outwardly away from said first segment and inclined at an angle in a first direction from the plane of said first segment, said third segment having one end thereof affixed to the other end of said first segment, said third segment having the other end thereof spaced outwardly away from said first segment and inclined at an angle in a second direction from the plane of said first segment, said first segment having an opening formed therein to provide access to the interior of the fusion reactor; and
   b. an intercoil structure including a multiplicity of intercoil sections, each of said multiplicity of intercoil sections interposed between an adjoining pair of toroidal field coils, each of said multiplicity of intercoil sections being cooperatively associated with a corresponding one of said multiplicity of membrane sections, each of said multiplicity of intercoil sections including a first spacer wedge and a second spacer wedge, said first spacer wedge and said second spacer wedge each being affixed to the corresponding one of said multiplicity of membrane sections such that said first spacer wedge and said second spacer wedge are located in spaced relation one to another and on opposite sides of the opening formed in said first segment of the corresponding one of said multiplicity of membrane sections.

2. In the fusion reactor as set forth in claim 1 wherein said first segment of each of said multiplicity of membrane sections includes reinforcing means.

3. In the fusion reactor as set forth in claim 1 wherein each of said multiplicity of intercoil sections is affixed to a corresponding one of said multiplicity of membrane sections by being welded thereto.

4. In the fusion reactor as set forth in claim 1 wherein each of said first spacer wedges includes a plurality of bearing plates positioned so as to be in contacting relation with each of an adjoining pair of toroidal field coils.

5. In the fusion reactor as set forth in claim 4 wherein each of said first spacer wedges further includes a plurality of cross plates cooperatively associated with said plurality of bearing plates thereof so as to form a rigid assembly therewith.

6. In the fusion reactor as set forth in claim 1 wherein each of said second spacer wedges includes a plurality of bearing plates positioned so as to be in contacting relation with each of an adjoining pair of toroidal field coils.

7. In the fusion reactor as set forth in claim 6 wherein each of said second spacer wedges further includes a plurality of cross plates cooperatively associated with said plurality of bearing plates thereof so as to form a rigid assembly therewith.

8. In the fusion reactor as set forth in claim 1 wherein each of said multiplicity of membrane sections includes cooperating flange portions.

9. In the fusion reactor as set forth in claim 8 wherein said membrane shell further include means for fastening said cooperating flange portions together for purposes of effecting the interconnection of said multiplicity of membrane sections.

10. In the fusion reactor as set forth in claim 9 wherein said membrane shall further include a plurality of tapered shear pins received in said cooperating flange portions.

* * * * *